US006507899B1

(12) United States Patent
Oberlaender et al.

(10) Patent No.: US 6,507,899 B1
(45) Date of Patent: Jan. 14, 2003

(54) INTERFACE FOR A MEMORY UNIT

(75) Inventors: Klaus Oberlaender, San Jose, CA (US); Sabeen Randhawa, Mountain View, CA (US); Yannick Martelloni, Poing (DE); Manfred Henftling, Furstenfeldbruck (DE); Rami Zemach, Hrzelia (IL); Zohar Peleg, Rosh Haayin (IL); Christian Wiedholz, Munich (DE); Gigy Baror, Ramat Gan (IL); Doron Shoham, Shoham (IL); Oded Trainin, Jerusalem (IL); Niv Margalit, Ramat-Hashsron (IL)

(73) Assignee: Infineon Technologies North American Corp., San Jose, CA (US)

( * ) Notice: Subject to any disclaimer, the term of this patent is extended or adjusted under 35 U.S.C. 154(b) by 0 days.

(21) Appl. No.: 09/460,534

(22) Filed: Dec. 13, 1999

(51) Int. Cl.$^7$ ................................. G06F 12/08
(52) U.S. Cl. ........................................ 711/169
(58) Field of Search ................. 711/154, 167, 711/169

(56) References Cited

U.S. PATENT DOCUMENTS

| 5,034,885 | A |   | 7/1991 | Matoba et al. ............. 364/200 |
| 5,283,890 | A |   | 2/1994 | Petolino, Jr. et al. ....... 395/425 |
| 5,783,949 | A | * | 7/1998 | Reohr et al. ................ 326/106 |
| 6,044,429 | A | * | 3/2000 | Ryan et al. ................. 710/131 |
| 6,094,399 | A | * | 7/2000 | Mick .......................... 365/233 |

FOREIGN PATENT DOCUMENTS

| DE | 4114053 A1 | 10/1991 |
| EP | 0 526 030 A1 | 2/1993 |

* cited by examiner

Primary Examiner—Kevin L. Ellis
(74) Attorney, Agent, or Firm—Fish & Richardson P.C.

(57) ABSTRACT

An interface circuit for coupling a data handling unit with a memory unit having control inputs, an address signal input, a data signal input, and a data signal output is described. The interface circuit comprises an address buffer having an input and an output, said input receiving an address signal from said data handling unit, a first multiplexer which couples said memory unit with either said output of said address buffer or with said address signal, a data buffer having an input and an output, said input receiving a data signal from said data handling unit and said output being coupled with said memory data input, a second multiplexer for selecting either said memory data signal output or said data buffer output, and a comparator for comparing said address signal with the signal from said address buffer output, generating a control signal which controls said second multiplexer.

16 Claims, 8 Drawing Sheets

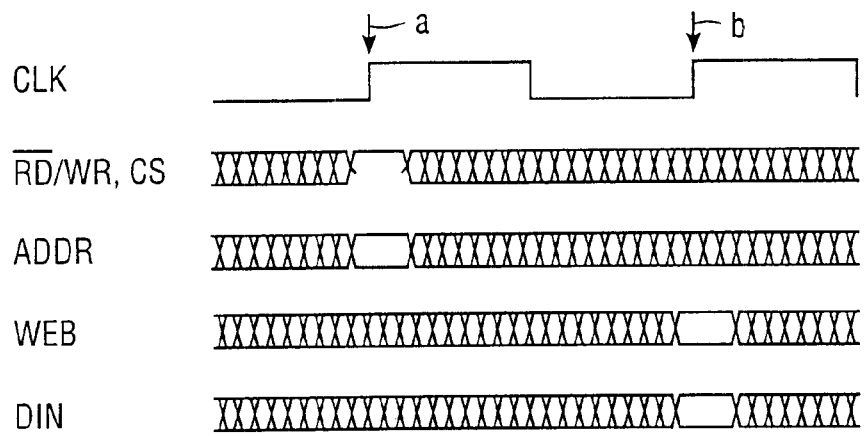
FIG. 2A  Basic Write Timing
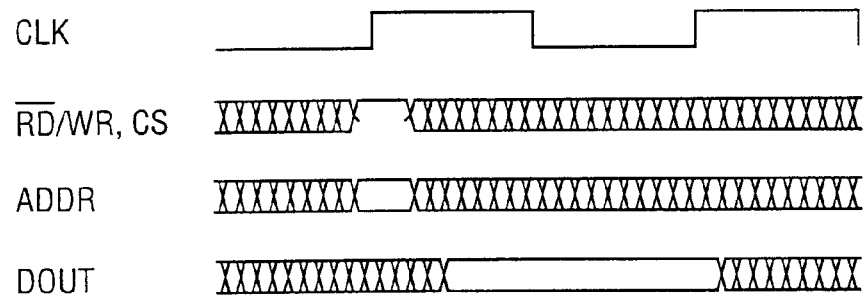
FIG. 2B  Basic Read Timing
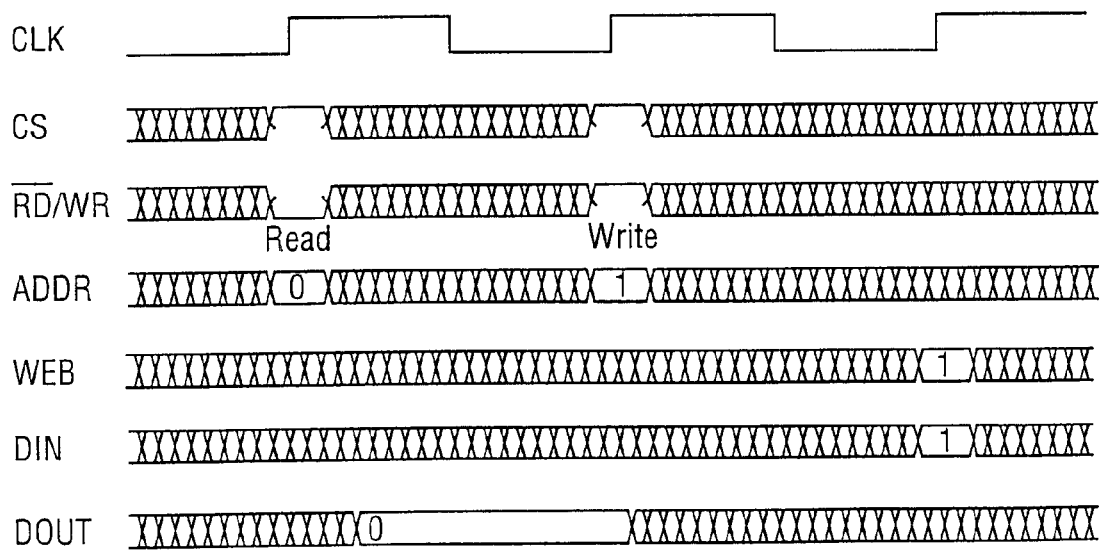
FIG. 2C  Basic Write after Read Timing

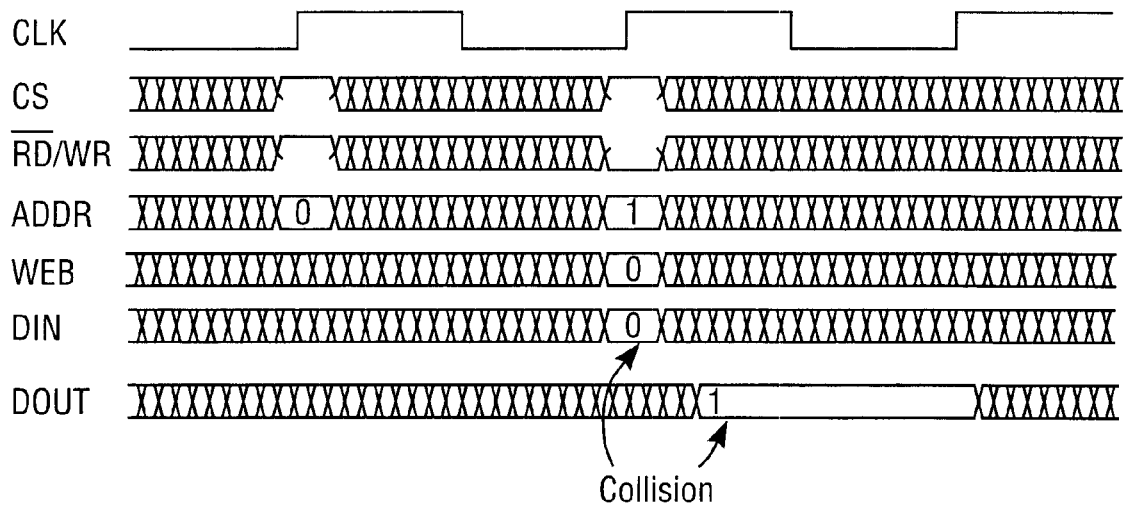
FIG. 2D Basic Read after Write Timing
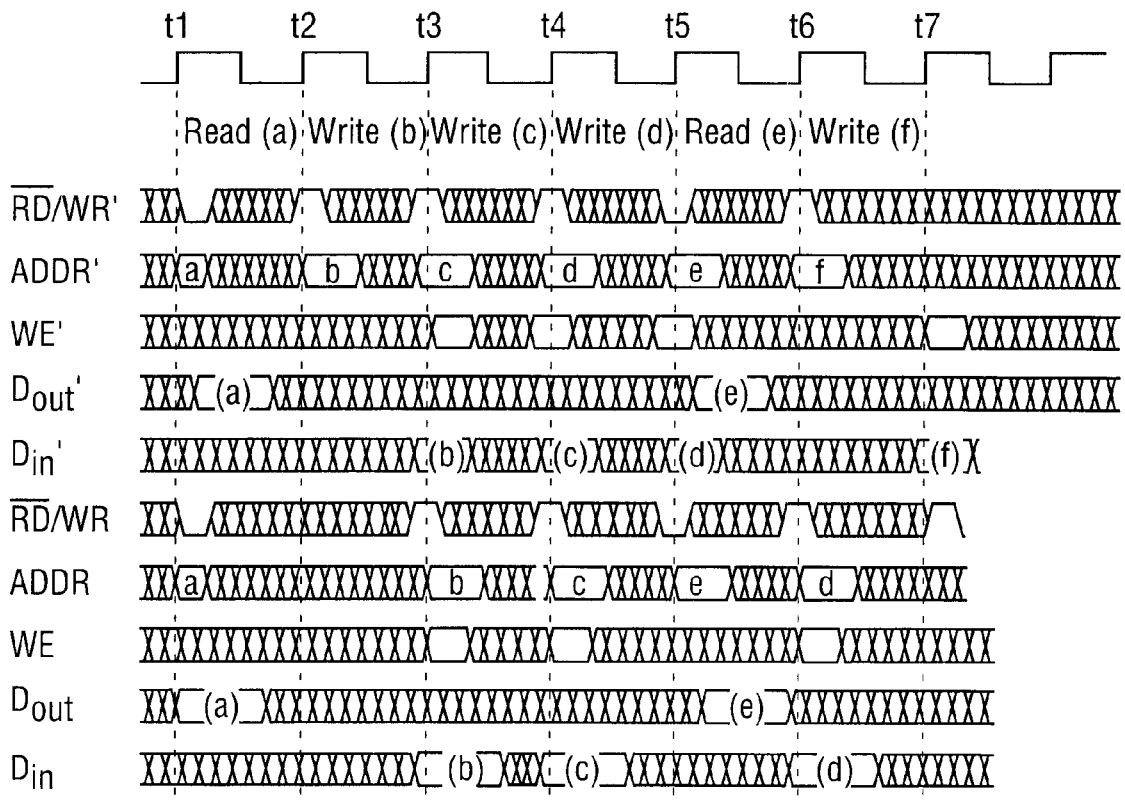
FIG. 3A

|  | Buffer | | | | MUX | | | | | SRAM |
|---|---|---|---|---|---|---|---|---|---|---|
| Cycle | 503 | 504 | 512 | 530 | 500 | 502 | 510 | 531 | 520 | R/W |
| W1 | – | 1 | – | – | – | – | – | – | – | – |
| W2 | 1 | 2 | 1 | 1 | 0 | 1 | 1 | 1 | – | W1 |
| R3 | 2 | 3 | 2 | 2 | 1 | – | – | 1 | 0 | R3 |
| W4 | 2 | 4 | 2 | 2 | 0 | 0 | 0 | 0 | – | W2 |
| R4 | 4 | 4 | 4 | 4 | 1 | – | – | 1 | I/O | – |
| W5 | 4 | 5 | 4 | 4 | 0 | 0 | 0 | 0 | – | W4 |
| IDLE | 5 | – | 5 | 5 | – | – | – | – | – | |

FIG. 7

INTERFACE FOR A MEMORY UNIT

BACKGROUND OF THE INVENTION

The present invention relates to an interface for a memory unit in particular to a microprocessor having a memory unit and an interface for coupling the memory unit with the central processing unit. One of the main factors, which determine the speed of a microprocessor, is defined by the interface between the central processing unit and the memory. Therefore, modern microprocessors have a fast cache or static random access memory (SRAM) on-chip to minimize access delays due to external memory access. These cache or SRAM memories have a very low access time and are capable of retrieving or writing data within up to only one processor cycle. If a memory unit, such as a cache memory, is capable of writing and reading data within one single processor cycle, the system would have the fastest possible access to data stored in this memory. Nevertheless, modern microprocessors or microcontrollers have a pipelined structure. In other words, each complete processing of an instruction is split up in several stages, such as fetching an instruction, decoding it, executing it, and writing back the result. These pipeline stages are executed sequentially and usually each pipeline stage is filled with a part of a different instruction. By execution of a plurality of instructions this provides the ability for a microprocessor in average to execute an instruction in one cycle. The more pipeline stages a processor has the more these stages will be diversified.

Due to characteristics of a pipelined microprocessor writing data within one single processor cycle can become impossible because the address and the data are not present at the same time. In such a system, usually the data to be written is available within a delay time (latency) of one cycle after the address is generated because each is generated in a different pipeline stage. As in a reading instruction data will be provided by the memory, only the memory access delay occurs and reading instructions can be executed in one cycle if the memory is fast enough. But, whenever a reading follows a writing the system will be delayed due to the above mentioned latency restrictions.

SUMMARY OF THE INVENTION

It is therefore object of the invention to provide an interface between a memory unit and a data handling unit, such as a central processing unit of a microprocessor or a microcontroller, which allows the fastest access to the memory. For example, a synchronous SRAM demands address and data simultaneously to perform with the highest possible operation speed.

This object is achieved by an interface circuit for coupling a data handling unit with a memory unit having control inputs, an address signal input, a data signal input, and a data signal output. The interface circuit comprises an address buffer having an input and an output, whereby the input receives an address signal from the data handling unit, a first multiplexer which couples the memory unit with either the output of the address buffer or with the address signal, a data buffer having an input and an output, the input receiving a data signal from the data handling unit and the output being coupled with the memory data input, a second multiplexer for selecting either the memory data signal output or the data buffer output, and a comparator for comparing the address signal with the signal from the address buffer output, generating a control signal which controls the second multiplexer.

The interface circuit can be implemented within a microprocessor or within a memory device. Most advantageously it is implemented in a microcontroller having a microprocessor and memory integrated on a single chip.

A further embodiment is an interface circuit for coupling a data handling unit with a memory unit having control inputs, an address signal input, a data signal input, and a data signal output. The interface comprises a first address buffer having an input and an output, whereby the input receives an address signal from the data handling unit. A second address buffer has an input and an output, whereby the input is coupled with the output of the first address buffer. A first multiplexer has inputs and an output and couples either the content of the first or second address buffer to its output. A second multiplexer which couples the memory unit with either the output of the first multiplexer or with the address signal is further provided. A data buffer has an input and an output, whereby the input receives a data signal from the data handling unit and the output is coupled with the memory data input. A third multiplexer for selecting either the memory data signal output or the data buffer output is provided. Furthermore, the interface comprises a comparator for comparing the content of the first and second address buffer, generating a control signal which controls the third multiplexer.

Furthermore, a method of writing data to an integrated memory unit within a microprocessor having a pipeline structure in which a data signal to be written into said memory is delayed with respect to an address signal is disclosed. The method comprises the steps of:

buffering said address signal, in case of a following write signal, storing said data signal under said buffered address signal, and buffering said following address signal, and in case of a following read signal, buffering said data signal.

BRIEF DESCRIPTION OF THE DRAWINGS

FIGS. 2A–2D show timing diagrams of memory units according to the prior art,

FIGS. 3A and 3B show timing diagrams of a memory with an interface according to the present invention, FIG. 7 shows a table indicating the content of the buffers and the status of the multiplexers during different cycles.

DETAILED DESCRIPTION OF THE PREFERRED EMBODIMENT

Figure 1:
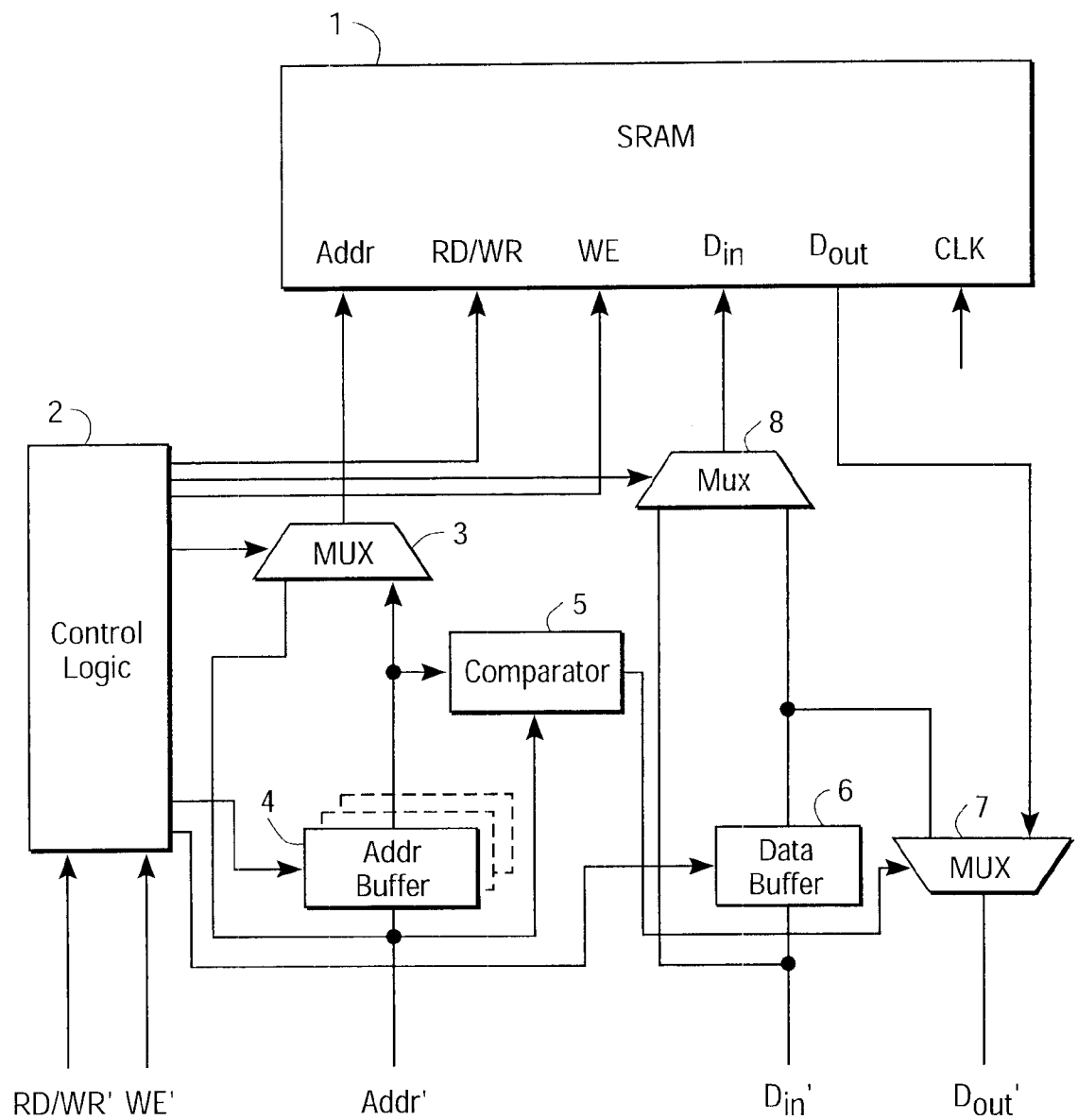
FIG. 1 shows a bock diagram showing the principle of the present invention.

FIG. 1 shows a block diagram of an arrangement according to a preferred embodiment of the present invention. A static random access memory module (SRAM) 1 provides a data input $D_{in}$ and a data output $D_{out}$, a clock input Clk a write enable input WE, a combined read/write input RD/WR, and a plurality of address inputs Addr. A control logic unit 2 receives an RD/WR' and a WE' or equivalent control signals, for example from a microprocessor, and generates the RD/WR and WE signals for the SRAM 1. Furthermore, control unit 2 generates a control signal for a multiplexer 3 and multiplexer 8. Multiplexer 3 receives a plurality of address signals Addr', e.g., from said microprocessor, at its first inputs and a plurality of address signals from an address buffer 4 which is controlled by control logic 2. The address buffer 4 has input lines which are coupled with the address signals Addr'. A comparator 5 is provided which compares the output signals of said address buffer with the address signals Addr'. Comparator 5 generates a control signal, which controls a second multiplexer 7. Multiplexer 7 receives a data signal $D_{out}$ from the SRAM 1 at its first input and a data signal from the output of a data buffer 6. The output of multiplexer 7 provides a data output signal $D_{out}'$. Data buffer 6 receives a data input signal $D_{in}'$, for example, from said microprocessor, and comprises an output which is coupled with a first input of a multiplexer 8 whose output is coupled with the data input $D_{in}$ of the SRAM 1. The second input of multiplexer 8 is coupled with the data input signal $D_{in}'$. Address buffer 4 and data buffer 6 are controlled by control logic 2. Data buffer 6 can include the multiplexer 8 to switch between the $D_{in}'$ signal and the output of data buffer 6.

FIGS. 2A–2D shows the standard timing characteristics of a synchronous SRAM within a pipelined microprocessor. In FIG. 2A the basic write timing is depicted. During the rising edge (a) of the clock signal Clk the RD/WR signal is asserted and at the same time the address signals are provided. Due to the pipeline architecture the data signals proper and the respective write enable bit signals are not available yet. These signals will be provided with the rising edge (b) of the next clock cycle.

In FIG. 2B the basic read timing within a pipelined processor is depicted. A read cycle takes only a single clock cycle because the only delay, which occurs, is the access time delay of the SRAM.

In FIG. 2C a read cycle followed by a write cycle is depicted. As a read cycle takes only a single clock cycle, a write cycle can follow immediately.

As described above, usually no timing problems occur if a read cycle follows another read cycle, a write cycle follows a write cycle, or a write cycle follows a read cycle.

FIG. 2D shows a write cycle immediately followed by a read cycle. In this event a collision occurs. Due to the delay of the data to be written the $D_{in}$ and $D_{out}$ signals are colliding. Therefore, a wait state for a read cycle following a write cycle has to be inserted.

To avoid this cycle penalty, the present invention provides a delayed write cycle. To this end, address buffer 4 and data buffer 6 are provided. Whenever a write cycle starts the address buffer 4 stores the provided addresses Addr' and data buffer 6 will store the data signals $D_{in}'$ in the following cycle. The control signals can be buffered or generated in the control logic 2. The writing to the SRAM will be deferred until the next write cycle starts. In other words, only if a write cycle follows this "initial" write cycle the data of this "initial" write cycle which are buffered in data buffer 6 will be written to SRAM 1 under the address buffered in address buffer 4 using multiplexer 3. As long as read cycle follow this "initial" write cycle, the write cycle proper to SRAM 1 will be deferred.

If one of the read cycles in-between the "initial" write cycle and the first following write cycles wants to read the same address as the "initial" write address, then the following steps take place: comparator 5 compares the address signals Addr' of any read cycle with the buffered address in address buffer 4. If these signals are equal then multiplexer 7 is controlled to output the buffered data from data buffer 6 to the output lines $D_{out}'$.

As an example, FIG. 3A shows a series of read and write cycles with an embodiment according to FIG. 1. FIG. 3A shows the RD/WR', ADDR', $D_{in}'$, $D_{out}'$ signals as well as the RD/WR, ADDR, WE, $D_{in}$, and $D_{out}$ signals. First, a read cycle is executed within cycle t1. In t2, a write cycle takes place and the associated address b is buffered in address buffer 4. In cycle t3 another write cycle occurs. Therefore, multiplexer 3 is switched to its second input using the buffered address signals from address buffer 4. Data (b) is written to SRAM 1 under the buffered address b and address c is buffered in address buffer 4. As data (b) is written in cycle t3 directly into SRAM 1, it does not have to be buffered in data buffer 6. In cycle t4 a further write cycle occurs. Therefore, data (c) will be written into SRAM 1 under the buffered address c from address buffer 4. Multiplexer 3 is again switched to the address buffer 4 in this case. In cycle t5 a read cycle starts. Multiplexer 3 is switched back to carry the address signal Addr' at its output. Now, data buffer 6 will buffer data (d) while SRAM 1 provides data (e) at output $D_{out}$. Multiplexer 7 is controlled to couple $D_{out}'$ with $D_{out}$. In the following cycle t6 another write cycle occurs. Multiplexer 3 is switched to the address buffer 4. The previously buffered address d and the buffered data (d) will now be written into SRAM while address buffer 4 buffers the new address f.

Figure 3B:
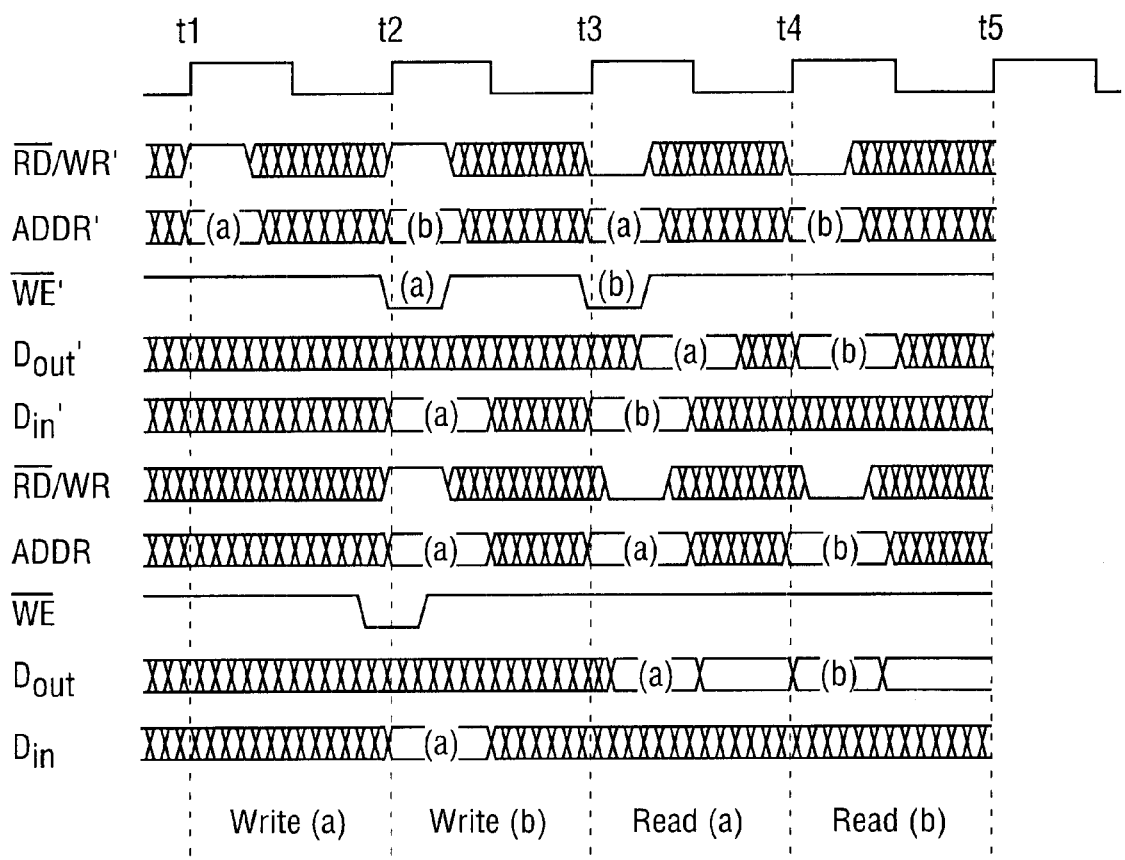

FIG. 3B shows another example of combinations of read and write cycles with an embodiment according to FIG. 1. During t1 a first write cycle occurs in which address a is buffered in address buffer 4. A second write cycle follows in t2. Therefore, the data (a) which is now provided will be written into SRAM 1 under the buffered address a. To this end, multiplexer 3 is switched to the address buffer 4. Furthermore, address b from the second write cycle is buffered in address buffer 4. During t3 a read cycle occurs. Multiplexer 3 is switched back to the address input Addr'. Data (b) which will be provided now is buffered in data buffer 6 and in parallel SRAM 1 is read out using the provided addresses at Addr', in this case address a. Multiplexer 7 is switched to couple the $D_{out}$ output of SRAM 1 with the output $D_{out}'$. In the next cycle t4 a read cycle occurs. This read cycle attempts to access the previously written address b. As this data has not been written to SRAM 1 yet the following scenario takes place: Comparator 5 compares the address signal Addr' with the buffered address in address buffer 4. As these addresses are identical, comparator 5 controls multiplexer 7 to connect the output of data buffer 6 with the output $D_{out}'$. In this special case SRAM 1 is not involved. The data is immediately accessible through data buffer 6. The comparator must be able to compare the incoming address Addr' with the buffered address in address buffer 4 and hold the result during the cycle. Holding means such as a buffer or register or any other appropriate means can do this.

Depending on the pipeline structure the delay between the providing of the address signal and the data signal in case of a write cycle may vary. As described above, this delay may be a single cycle. It is of course possible that this delay is enlarged due to the structure of the pipeline. In this case the above-described store forwarding mechanism has to be adapted. For example, if the delay is two cycles, two address buffer and the respective logic is necessary to buffer these signals before the actual data is written to the SRAM. This is indicated by dotted additional address buffers in FIG. 1. The number of address buffers is as deep as the delay between address and data signals is. The required logic to control these buffers increases respectively.

Figure 4:
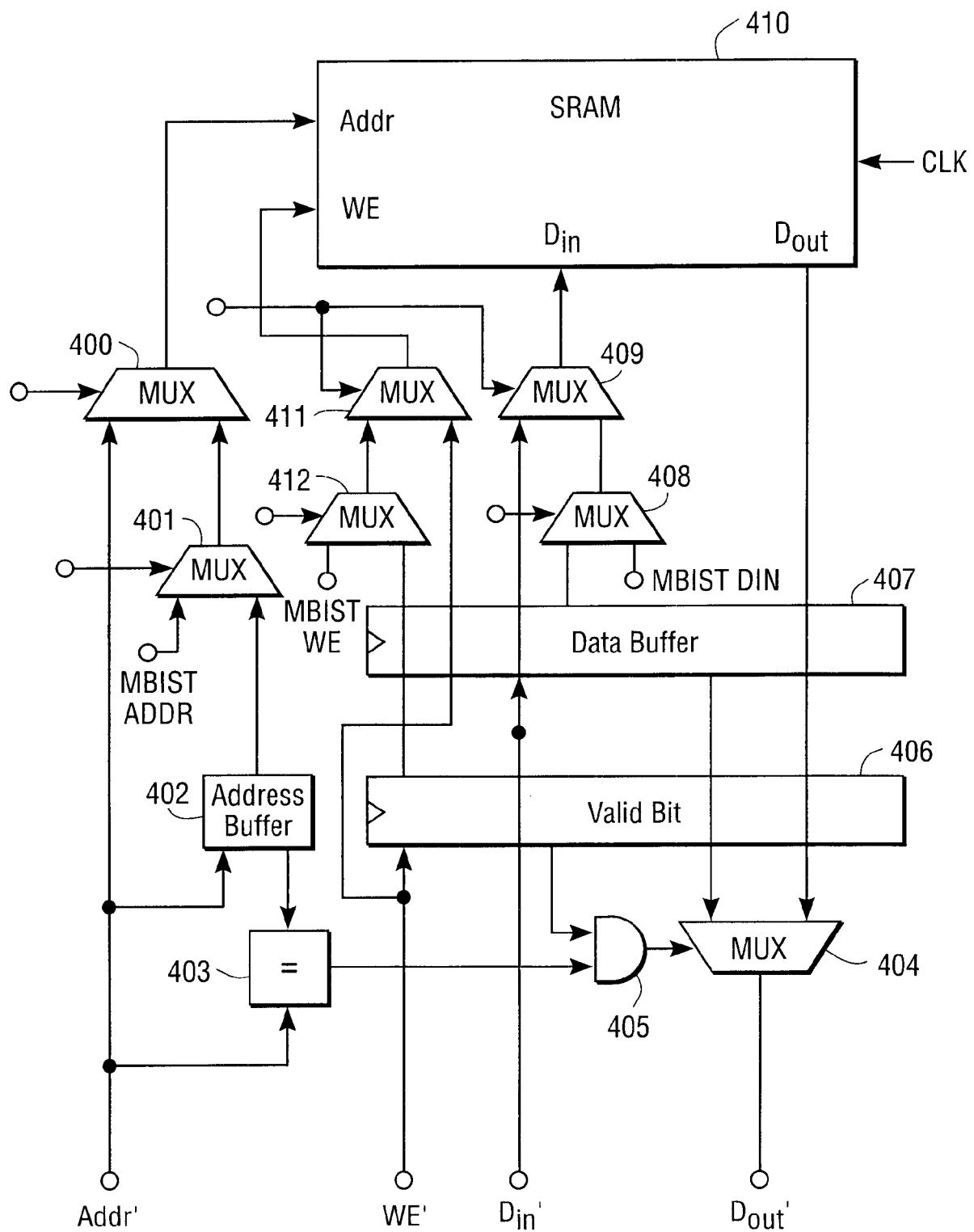
FIG. 4 shows another embodiment of an interface according to the present invention.

FIG. 4 shows a further preferred embodiment according to the present invention. In this embodiment a memory build in self-test (MBIST) function is combined with the above-described store forwarding mechanism. Again, a SRAM 410 comprises address input Addr, write enable input WE, data input $D_{in}$, and Data output $D_{out}$. The address input proper Addr' is coupled with the first input of a multiplexer 400, with the input of an address buffer 402, and with the first input of a comparator 403. The output of address buffer 402 is coupled with the second input of comparator 403 and the first input of a multiplexer 401. The output of multiplexer 401 is coupled with the second input of multiplexer 400 whose output is connected to the address input Addr of SRAM 410. Multiplexer 400 is controlled by control and MBIST control signals and multiplexer 401 is controlled by a respective MBIST control signal. The second input of multiplexer 401 is connected to test address lines MBIST ADDR. The write enable signal WE' is coupled with a valid bit register 406 and the first input of a multiplexer 411. The valid register is as wide as the data register and reflects the WE signal for each bit. This has the advantage of being able to decide the actual size of the data word, which is written into the SRAM, for example, 8, 16, or 32 bits. Also, single bit manipulation is possible in a convenient way by validating the respective bits of the valid register 406. In this embodiment each bit of a word in the SRAM has its own WE line. Of course, this scheme can be easily adapted to different organized SRAM's with, for example, only a single WE line. The second input of multiplexer 411 is coupled with the output of multiplexer 412. Multiplexer 412 receives at its first input the MBIST WE signal and at its second input the output signal from the valid bit register 406. Multiplexers 411 is controlled by a combined control and MBIST control signal and multiplexer 412 is controlled by a respective MBIST control signal. The output of valid bit buffer 406 is also connected per bit to the first input of an AND gate 405 whose second input is coupled with the output of comparator 403. The data input $D_{in}$' is coupled with the input of a data buffer 407 and the first input of a multiplexer 409 whose second input is coupled with the output of multiplexer 408. The first input of multiplexer 408 is coupled with the output of data buffer 407. The second input of multiplexer 408 receives a MBIST $D_{in}$ signal. Multiplexer 408 is controlled by a respective MBIST control signal and multiplexer 412 is again controlled by a combined control and MBIST control signal. A control unit (not shown) generates all control and MBIST control signals. The output of multiplexer 409 is coupled with the data input $D_{in}$ of SRAM 410. The data output $D_{out}$ of SRAM 410 is coupled with the first input of a multiplexer 404 whose second input is coupled with the output of data buffer 407. The output of AND gate 405 controls multiplexer 404 per bit whose output is coupled with the data output $D_{out}$'. This embodiment has a similar functionality whenever the respective MBIST control signals are set to the normal operation mode, namely the read/write mode. In this mode multiplexer 401 is switched to the address buffer 402, multiplexer 412 to the valid bit register, and multiplexer 408 to the data buffer 407. Valid bit buffer 406 is provided to indicate whether data buffer 407 contains valid data as described above. The bits in this buffer are set for the respective bits in data buffer 407 whenever those bits of data buffer 407 are written and address buffer 402 contains the appropriate address. Through AND gate 405 multiplexer 404 switches between the output of data buffer 407 and the data output $D_{out}$ of SRAM 410. Whenever the MBIST control signal is switched to MBIST function, multiplexer 401 is switched to the MBIST ADDR input. Multiplexer 400 is then switched to the output of multiplexer 401 and the MBIST unit (not shown) can provide different test addresses to SRAM 410 through the MBIST ADDR input. Also, the write enable signal will be switched to the MBIST WE signal through multiplexer 411 and 412. Data can be provided to SRAM 410 in this mode by means of multiplexer 409 and multiplexer 408. Usually, in embodiments of SRAM's with MBIST functionality according to the prior art, outside multiplexers are used which switch between the respective signals. This might slow down the access time to the SRAM because additional setup time is necessary. The additional multiplexers needed for the MBIST functionality according to the present invention, in which the MBIST functionality is fully integrated in the SRAM interface, are placed in a timing uncritical path.

Figure 5:
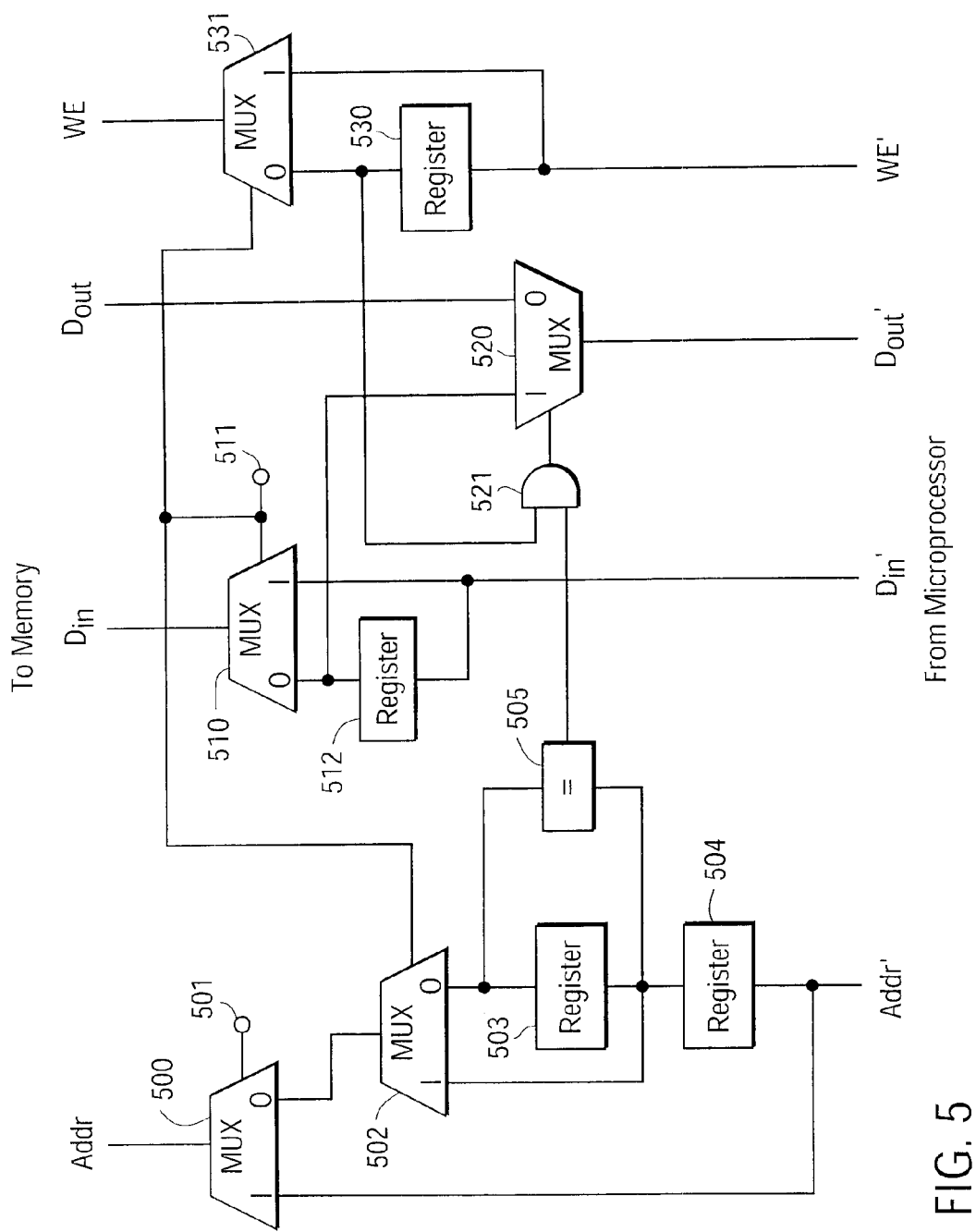
FIG. 5 shows yet another embodiment of an interface according to the present invention.

FIG. 5 shows another embodiment according to the present invention. Address lines Addr' from the microprocessor side are coupled with a first input of a multiplexer 500 and with the input of a buffer or register 504. The output of multiplexer 500 carries the address signal Addr for the memory unit. The output of register 504 is coupled with the input of register 503 and the first input of multiplexer 502 whose output is coupled with the second input of multiplexer 500. Multiplexer 500 is controlled by a control signal 501. The output of register 503 is coupled with the second input of multiplexer 502. The output of registers 503 and 504 are coupled with respective inputs of a comparator 505 whose output signal is coupled with the first input of an AND gate 521 per bit. The output signal of AND gate 521 controls a multiplexer 520. Data input lines $D_{in}$' from the microprocessor are coupled with a first input of a multiplexer 510 and the input of register 512. The output of register 512 is coupled with the second input of multiplexer 510 whose output carries the input data signal for the memory unit. The first input of multiplexer 520 is coupled with the output of register 512. The second input of multiplexer 520 is coupled with the output data lines $D_{out}$ of the memory unit and its output carries the output data signals for the microprocessor. The write enable signal WE' from the microprocessor is coupled with the first input of a multiplexer 531 and the input of a register 530. The output of register 530 is coupled with the second input of multiplexer 531 whose output carries the write enable signal WE for the memory unit. Furthermore, the output of register 530 is coupled with the second input of AND gate 521 per bit. Multiplexers 502, 510, and 531 are controlled by control signal 511.

Figure 6:
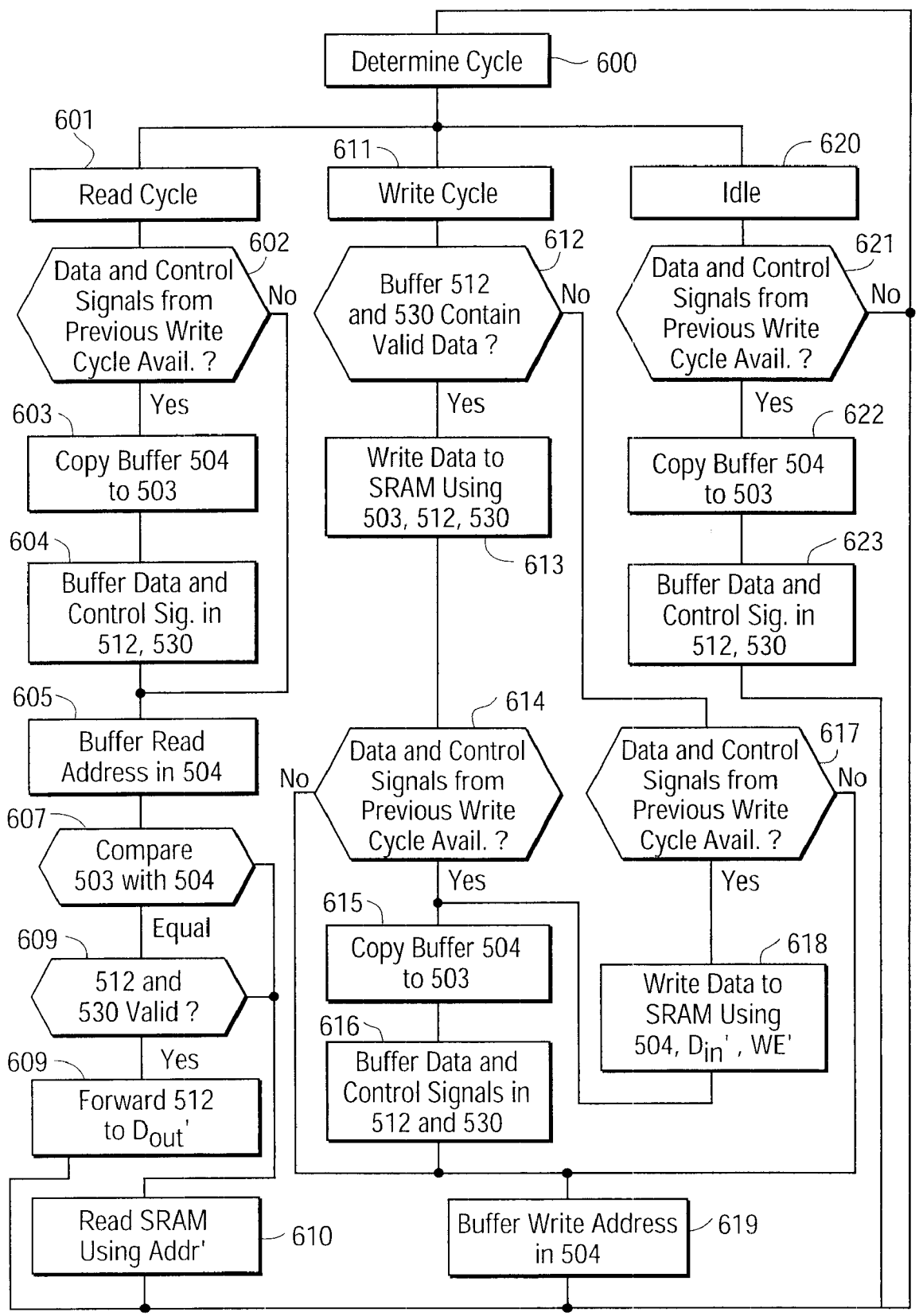
FIG. 6 shows a flow chart diagram showing the steps of reading and writing through a memory interface according to the present invention.

This arrangement allows a less critical implementation of the comparator 505. In case of a write cycle, register 504 buffers the address Addr'. If a read cycle occurs in the following cycle the associated data Din' for the write cycle are stored in register 512 and the write enable signal WE' in register 530. Also, the buffered address of the previous write cycle gets forwarded into register 503 and the read cycle address gets stored into register 504. Comparator 505 compares both addresses. As both addresses are stored within registers the comparison proper is less time critical and the address setup time which is most critical does not suffer. If both addresses are identical then multiplexer 520 is controlled by comparator 505 to forward the content of register 512 to the data output $D_{out}$' if the corresponding WE bit is set for each bit position to. If the compared addresses are different then multiplexer 520 couples data output $D_{out}$' with the data output $D_{out}$ of the memory unit and a regular read cycle takes place. To this end, multiplexer 500 couples the address lines Addr' with the memory unit address lines Addr. Registers 503, 512, and 530 keep the buffered write cycle addresses, data, and control signal while read cycles are performed until another write cycle occurs. If a second write cycle follows then the content of register 512 is actually written into the memory unit under the address buffered by register 503 using the WE or valid bits of register 530. Therefore, multiplexers 502 and 500 switch to the appropriate inputs. Register 530 buffers the write enable signal. This signal can be used to determine whether a write cycle should actually be performed, for example, indicating a write control signal in case of a cache hit. It also can be used in a similar way as shown in FIG. 4 as an indicator as to whether data or single bits in register 512 are valid and therefore have to be written. WE and valid signal are therefore identical in this embodiment. FIG. 6 shows a flow chart of the different cycles, which can occur.

A read cycle starts with step 602 where it is determined whether any data and control signals from a previous write cycle are available or in other words whether the previous cycle was a write cycle. If so, then steps 603–605 copy the content of buffer 504 to 503, the transferred data and control signals are stored in buffers 512 and 530, respectively, and the actual address transmitted with the read cycle is buffered in register 504. Next or if the above steps have been skipped, the content of registers 503 and 504 are compared in step 607. If they are equal then it is checked in step 608 whether registers 512 and 530 contain valid data. If so, then the content of register 512 is forwarded to the output $D_{out}'$ in step 609. FIG. 6 only shows the store forward function during a read cycle where the content comes either from the store forwarding buffer or directly from the SRAM. If the interface allows single bits to be altered, then only those bits which are valid will be forwarded from the respective buffer in step 609. In parallel, the SRAM is read and the remaining bits of the respective data word are merged with the buffered bits. If step 607 or 608 result differently, then multiplexer 500 couples the address signals Addr' with the address input of the SRAM and the respective memory cells of the SRAM are read and their content is transferred to the data output $Do_{out}'$ in step 610.

During a write cycle it is first checked in step 612 whether the buffers 512 and 530 contain valid data. If so, then in the following step 613 the content of buffer 512 is written to the SRAM under the address buffered in buffer 503. Next in step 614, it is checked whether data and control signals from a previous write cycle are available. If so, then in step 615 buffer 504 is copied to buffer 503 and the data and control signals are buffered in 512 and 530, respectively. If in step 612 the decision is "no", then in step 617 it is checked whether data and control signals from a previous write cycle are available. If so, then in step 618 those data are directed to the SRAM switching multiplexers 510 and 531 to input "1". . . Multiplexer 502 is also switched to input "1" using the output signal of register 504 as the associated address. Multiplexer 500 is switched to input "0". Next, steps 615 to 616 follow. In step 619 which follows step 616 the new address from the current write cycle is buffered in register 504. If no data and control signals from a previous write cycle are available in step 617 then only step 619 follows.

During an idle cycle it only has to be checked instep 621 whether data and control signals from a previous write cycle are available. If so, then buffer 504 is copied to buffer 503 and the incoming data and control signals are buffered in registers 512 and 530, respectively.

Alternatively step 618 can be followed directly by step 619 thereby skipping steps 615 and 616. In this embodiment data can be read from SRAM within a single cycle. Therefore, if the incoming data in step 618 is written into the SRAM it can be read within the next cycle from the SRAM. IF steps 615 and 816 are used after step 618, forwarding as described in steps 607–609 can be used.

FIG. 7 shows a table displaying the different contents of the buffers/registers and the status of the multiplexers during different cycles. It is assumed that all registers/buffers are empty before the first cycle W1. W1 is a write cycle during which the address "1" is written into register 503. It is assumed that the next cycle is a write cycle W2. During this cycle the data and control signals from the previous write cycle W1 arrive and are stored in registers 512, and 530, respectively. In parallel they are written into the SRAM. Therefore, multiplexer 500 is switched to input 0 and multiplexers 502, 510, and 531 to input 1. The next cycle is assumed to be a read cycle R3. During this cycle the now incoming data and control signals from the previous write cycle are buffered in registers 512 and 530. The previously stored address is copied from register 504 into register 503. The new incoming address is fed to the SRAM through multiplexer 500 which is switched to input 1 and stored in register 504. Comparator 505 compares the content of registers 504 and 503. In this case they are different. Therefore, multiplexer 520 is switched to input 0 and feeds the data read from the SRAM to the output $D_{out}'$. Multiplexer 531 is switched to input 1 to couple the control signal WE' with the respective control input of the SRAM. During the next cycle which is assumed to is another write cycle W4, the previously buffered address, data and control signals are used to write the buffered data into the SRAM. Therefore, multiplexer 500 is switched to 0 and multiplexers 502, 510, and 531 are switched to input 0, respectively. The newly submitted address "4" is stored in register 503. During a following read cycle R4 the now incoming data and control signals are stored into registers 512 and 530. Also, the content of register 504 is copied into register 503 and the newly arrived address for the read cycle is stored in register 504. Comparator 505 compares the content of both registers 503, and 504 and as they are identical switches multiplexer 520 to input 1. Therefore, the content of register 512 is forwarded to output $D_{out}'$ for those bits which are set valid. If necessary these forwarded bits are combined with the respective bits from the SRAM which were set invalid for buffer 512. In the following write cycle W5 the content of registers 503, 512, and 530 is again used to write into the SRAM as described above with respect to write cycle W4. During a following IDLE cycle the now incoming data and control signals from the previous write cycle W5 are stored in registers 512 and 530 and the content of register 504 is copied into register 503. Alternatively, during an idle cycle if the buffer is full or if data is incoming from a previous write cycle these data can be written into the SRAM.

In summary, no wait states have to be inserted during a read after write sequence and the microprocessor can operate at full speed.

What is claimed is:

1. Interface circuit for coupling a data handling unit with a memory unit having control inputs, an address signal input, a data signal input, and a data signal output, comprising:

an address buffer having an input and an output, said input receiving an address signal from said data handling unit;

a first multiplexer which couples said memory unit with either said output of said address buffer or with said address signal;

a data buffer having an input and an output, said input receiving a data signal from said data handling unit and said output being coupled with said memory data input;

a second multiplexer for selecting either said memory data signal output or said data buffer output;

a comparator for comparing said address signal with the signal from said address buffer output, generating a control signal which controls said second multiplexer; and a further multiplexer comprising two inputs and an output is provided, said output being coupled with the data input of said memory, the first input being coupled with the output of said data buffer, and the second input receiving said data signal from said data handling unit.

2. Interface circuit for coupling a data handling unit with a memory unit having control inputs, an address signal input, a data signal input, and a data signal output, comprising:

an address buffer having an input and an output, said input receiving an address signal from said data handling unit;

a first multiplexer which couples said memory unit with either said output of said address buffer or with said address signal;

a data buffer having an input and an output, said input receiving a data signal from said data handling unit and said output being coupled with said memory data input;

a second multiplexer for selecting either said memory data signal output or said data buffer output;

a comparator for comparing said address signal with the signal from said address buffer output, generating a control signal which controls said second multiplexer; and a further multiplexer with two inputs and an output is provided, said output being coupled with said first multiplexer, said first input being coupled with the output of said address buffer and said second input receiving a test address.

3. Interface according to claim 2, wherein another multiplexer having two inputs and an output is provided, said output being coupled with said data signal input of said memory, said first input receiving said output signal of said data buffer, and said second input receiving a test data signal.

4. Interface according to claim 3, wherein said memory unit comprises a write enable input and wherein said interface comprises a write enable buffer having an input and an output, said input being coupled with a write enable signal from said data handling unit, a write enable multiplexer having two inputs and an output, said first input being coupled with said write enable signal and said second input being coupled with said output of said write enable buffer, said output of said multiplexer being coupled with said write enable input of said memory unit.

5. Interface according to claim 3, wherein a further multiplexer is provided for selecting between said write enable buffer output and a write enable test signal.

6. Microprocessor having a central processing unit, a memory unit having control inputs, an address signal input, a data signal input, and a data signal output, and an interface unit comprising:

an address buffer having an input and an output, said input receiving an address signal from said data handling unit;

a first multiplexer which couples said memory unit with either said output of said address buffer or with said address signal;

a data buffer having an input and an output, said input receiving a data signal from said data handling unit and said output being coupled with said memory data input;

a second multiplexer for selecting either said memory data output signal or said data buffer output;

a comparator for comparing said address signal with the signal from said address buffer output, generating a control signal which controls said second multiplexer; and a further multiplexer comprising two inputs and an output is provided, said output being coupled with the data input of said memory, the first input being coupled with the output of said data buffer, and the second input receiving said data signal from said data handling unit.

7. Microprocessor having a central processing unit, a memory unit having control inputs, an address signal input, a data signal input, and a data signal output, and an interface unit comprising:

an address buffer having an input and an output, said input receiving an address signal from said data handling unit;

a first multiplexer which couples said memory unit with either said output of said address buffer or with said address signal;

a data buffer having an input and an output, said input receiving a data signal from said data handling unit and said output being coupled with said memory data input;

a second multiplexer for selecting either said memory data output signal or said data buffer output;

a comparator for comparing said address signal with the signal from said address buffer output, generating a control signal which controls said second multiplexer; and a further multiplexer with two inputs and an output is provided, said output being coupled with said first multiplexer, said first input being coupled with the output of said address buffer and said second input receiving a test address.

8. Microprocessor having a central processing unit, a memory unit having control inputs, an address signal input, a data signal input, and a data signal output, and an interface unit comprising:

an address buffer having an input and an output, said input receiving an address signal from said data handling unit;

a first multiplexer which couples said memory unit with either said output of said address buffer or with said address signal;

a data buffer having an input and an output, said input receiving a data signal from said data handling unit and said output being coupled with said memory data input;

a second multiplexer for selecting either said memory data output signal or said data buffer output;

a comparator for comparing said address signal with the signal from said address buffer output, generating a control signal which controls said second multiplexer; and another multiplexer having two inputs and an output is provided, said output being coupled with said data signal input of said memory, said first input receiving said output signal of said data buffer, and said second input receiving a test data signal.

9. Microprocessor according to claim 8, wherein said memory unit comprises a write enable input and wherein said interface comprises a write enable buffer having an input and an output, said input being coupled with a write enable signal from said data handling unit, a write enable multiplexer having two inputs and an output, said first input being coupled with said write enable signal and said second input being coupled with said output of said write enable buffer, said output of said multiplexer being coupled with said write enable input of said memory unit.

10. Microprocessor according to claim 9, wherein a further multiplexer is provided for selecting between said write enable buffer output and a write enable test signal.

11. Method of writing data to an integrated memory unit within a microprocessor having a pipeline structure in which a data signal to be written into said memory is delayed at least one cycle with respect to an associated address signal, said method comprising the steps of:

buffering said associated address signal in a first cycle;

in case of a following write signal in a subsequent second cycle, storing said data signal under said buffered associated address signal, and buffering said following address signal;

in case of a following read signal in a subsequent second cycle, buffering said data signal; and setting a valid bit for each bit of said buffered data signal in a valid bit register if both address and data have been buffered; and writing each bit of said buffered address and data only if said valid bit has been set.

12. Method according to claim 11, further comprising:

determining an actual size of a data word corresponding to said buffered data signal which is to be written into said memory unit based on a total number of valid bits set in said valid bit register.

13. Method according to claim 11, wherein in case of a plurality of succeeding write cycles a plurality of write addresses and the respective data are buffered in a plurality of address and data buffers.

14. Interface circuit for coupling a data handling unit with a memory unit having control inputs, an address signal input, a data signal input, and a data signal output, comprising:

a first address buffer having an input and an output, said input receiving an address signal from said data handling unit;

a second address buffer having an input and an output, said input being coupled with said output of said first address buffer;

a first multiplexer having inputs and an output which couples either the content of the first or second address buffer to its output;

a second multiplexer which couples said memory unit with either said output of said first multiplexer or with said address signal;

a data buffer having an input and an output, said input receiving a data signal from said data handling unit and said output being coupled with said memory data input;

a third multiplexer for selecting either said memory data signal output or said data buffer output;

a comparator for comparing the content of said first and second address buffer, generating a control signal which controls said third multiplexer; and a fourth multiplexer with two inputs and an output is provided, said output being coupled with the data input of said memory, the first input being coupled with the output of said data buffer, and the second input receiving said data signal from said data handling unit.

15. Interface circuit for coupling a data handling unit with a memory unit having control inputs, an address signal input, a data signal input, and a data signal output, comprising:

a first address buffer having an input and an output, said input receiving an address signal from said data handling unit;

a second address buffer having an input and an output, said input being coupled with said output of said first address buffer;

a first multiplexer having inputs and an output which couples either the content of the first or second address buffer to its output;

a second multiplexer which couples said memory unit with either said output of said first multiplexer or with said address signal;

a data buffer having an input and an output, said input receiving a data signal from said data handling unit and said output being coupled with said memory data input;

a third multiplexer for selecting either said memory data signal output or said data buffer output;

a comparator for comparing the content of said first and second address buffer, generating a control signal which controls said third multiplexer; and a control signal buffer with an input and an output and a fifth multiplexer with two inputs and an output, said input of said control signal buffer being coupled with a control signal provided by said data handling unit and said multiplexer output being coupled with the control input of said memory, the first input being coupled with the output of said control buffer, and the second input receiving said control signal from said data handling unit.

16. Interface circuit for coupling a data handling unit with a memory unit having control inputs, an address signal input, a data signal input, and a data signal output, comprising:

an address buffer having an input and an output, said input to receive a first address signal from said data handling unit in a first cycle;

a data buffer having an input and an output, said input to receive a data signal associated with said first address signal from said data handling unit in a delayed second cycle and said output being coupled with said memory data input; and a valid bit register having an input and an output, said input to receive a write enable signal from said data handling unit and said output being coupled with said memory unit, wherein said valid bit register contains a valid bit for each bit of said data signal, wherein said valid bit register sets each said valid bit when both said address signal and said data signal have been buffered, and wherein said valid bit register provides a write enable signal for each bit of said data signal.

* * * * *